(12) United States Patent  
Vigeland et al.

(10) Patent No.: US 12,668,489 B2  
(45) Date of Patent: Jun. 30, 2026

(54) DUAL PRESSURE PLANT FOR THE PRODUCTION OF NITRIC ACID AND METHOD FOR OPERATING SAME

(71) Applicant: Yara International ASA, Oslo (NO)

(72) Inventors: Bent Vigeland, Skien (NO); Halvor Øien, Porsgrunn (NO); Ronald Rösler, Skien (NO); André De Smet, Terneuzen (NO); Peter Fauconnier, Grimbergen (NO)

(73) Assignee: YARA INTERNATIONAL ASA, Oslo (NO)

( * ) Notice: Subject to any disclaimer, the term of this patent is extended or adjusted under 35 U.S.C. 154(b) by 609 days.

(21) Appl. No.: 18/024,170

(22) PCT Filed: Sep. 14, 2021

(86) PCT No.: PCT/EP2021/075157  
§ 371 (c)(1),  
(2) Date: Mar. 1, 2023

(87) PCT Pub. No.: WO2022/053698  
PCT Pub. Date: Mar. 17, 2022

(65) Prior Publication Data  
US 2023/0264957 A1 Aug. 24, 2023

(30) Foreign Application Priority Data

Sep. 14, 2020 (EP) ..................................... 20195977

(51) Int. Cl.  
C25B 1/04 (2021.01)  
B01D 53/56 (2006.01)  
C01B 21/40 (2006.01)

(52) U.S. Cl.  
CPC .............. *C01B 21/40* (2013.01); *B01D 53/56* (2013.01); *B01D 2252/103* (2013.01); *B01D 2257/404* (2013.01)

(58) Field of Classification Search  
None  
See application file for complete search history.

(56) References Cited

U.S. PATENT DOCUMENTS

| | | | |
|---|---|---|---|
| 3,881,004 A | 4/1975 | Kelly | |
| 4,427,504 A | 1/1984 | Stucki | |

(Continued)

FOREIGN PATENT DOCUMENTS

| | | |
|---|---|---|
| CL | 2018001131 A1 | 8/2018 |
| CL | 2018002302 A1 | 9/2018 |

(Continued)

OTHER PUBLICATIONS

Thyssenkrupp Nucera. The Four Main Types of Water Electrolysis Technology. https://www.thyssenkrupp-nucera.com/newsroom/blog/the-four-main-types-of-water-electrolysis-technology 2026. (Year: 2026).*

(Continued)

*Primary Examiner* — Sheng H Davis  
(74) *Attorney, Agent, or Firm* — Dilworth IP, LLC

(57) ABSTRACT

A dual pressure plant for the production of nitric acid, comprising:
  an air compressor;
  a converter, operating at a low pressure (LP), operable to be fed with a stream of an ammonia/pressurized air mixture to produce an LP gaseous NOx gas/steam mixture, comprising water, NO, $NO_2$ and $N_2O_4$;
  a NOx gas compressor;
  an absorber unit (6); and
  a bleacher unit;

(Continued)

Figure 1:
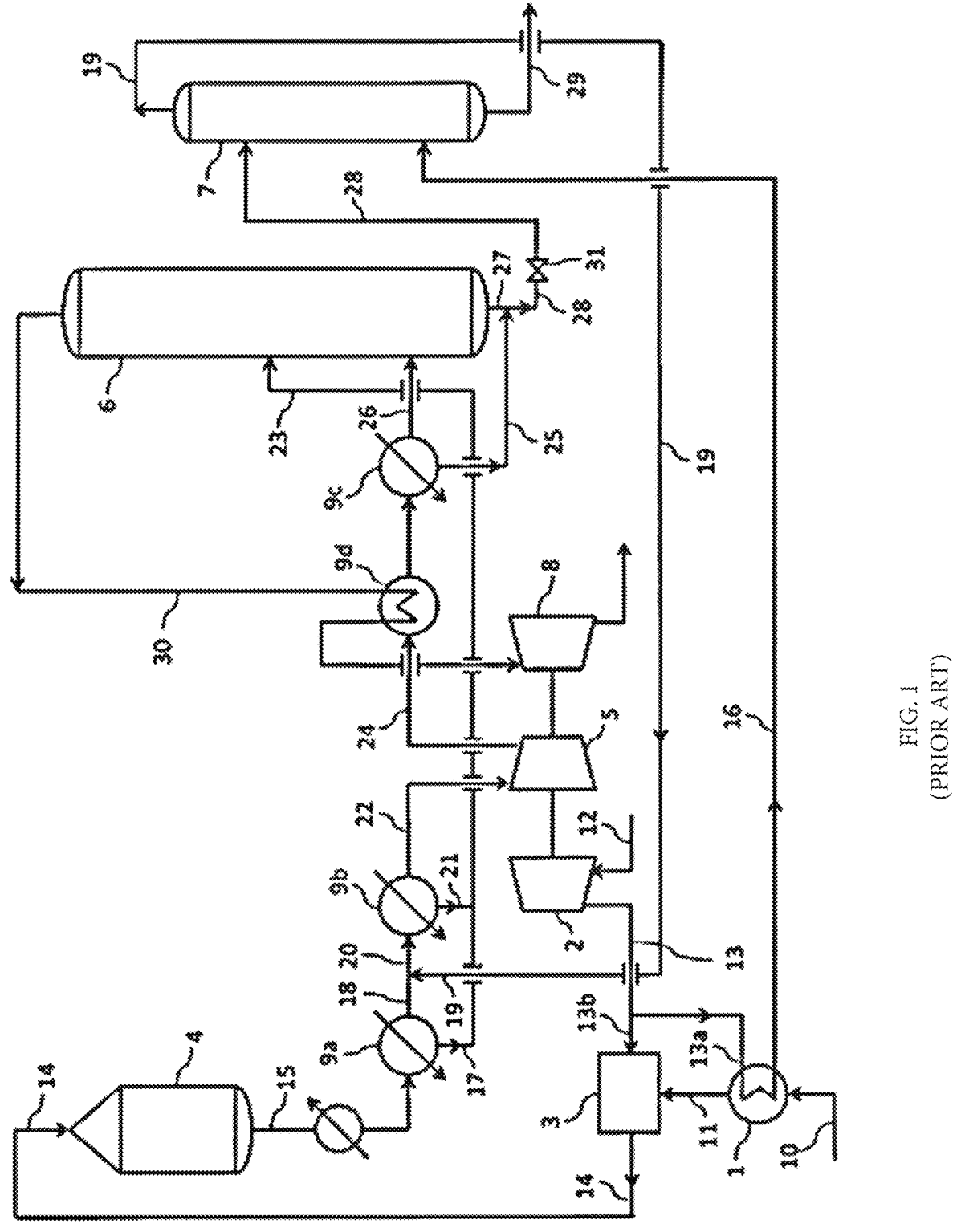

wherein the plant comprises means for directing the NOx-loaded stripping gas to the downstream side of the NOx gas compressor;

the plant being characterized in that it further comprises a high-pressure (HP) water electrolyser, in fluid communication with the bleacher unit.

13 Claims, 4 Drawing Sheets

(56) References Cited

U.S. PATENT DOCUMENTS

| | | |
|---|---|---|
| 2011/0243797 A1 | 10/2011 | Da Silva Ferreira Alves et al. |
| 2011/0245567 A1 | 10/2011 | Da Silva Ferreira Alves et al. |
| 2014/0170028 A1 | 6/2014 | Freet et al. |
| 2014/0223951 A1 | 8/2014 | Arora |
| 2016/0122885 A1 | 5/2016 | Ishikawa |
| 2019/0218097 A1 | 7/2019 | Postma |
| 2020/0071167 A1 | 3/2020 | Cerea |

FOREIGN PATENT DOCUMENTS

| | | | |
|---|---|---|---|
| CN | 102530893 | * | 7/2012 |
| CN | 103112835 | * | 5/2013 |
| CN | 106586985 | * | 4/2017 |
| CN | 109516445 | * | 3/2019 |
| CN | 109516445 A | | 3/2019 |
| CN | 208776318 U | | 4/2019 |
| CN | 110871028 | * | 3/2020 |
| CN | 111108064 | * | 5/2020 |
| JP | 2004084042 | * | 3/2004 |
| RU | 2032612 C1 | | 4/1995 |
| RU | 170311 U1 | | 4/2017 |
| WO | 93/14308 A1 | | 7/1993 |
| WO | 2011/089124 A2 | | 7/2011 |
| WO | 2018162150 | | 9/2018 |
| WO | WO-2018162150 A1 * | 9/2018 | ............ C01B 21/46 |
| WO | 2020035521 A1 | | 2/2020 |

OTHER PUBLICATIONS

Miola et al., "Utilization of stainless steels and special metals in nitric acid and urea production plants", Materials and Corrosion, Wiley, vol. 43, No. 8, Aug. 1, 1992, pp. 396-401, XP000349762.

International Search Report and Written Opinion issued in App. No. PCT/EP2021/075157, mailing date Nov. 23, 2021, 15 pages.

Office Action received for Chile Patent Application No. 202300710, mailed on Sep. 4, 2024, 12 pages (9 pages of English Translation and 3 pages of Original Document).

Office Action received for Russian Patent Application No. 2023105902, mailed on Oct. 9, 2024, 7 pages of English translation only.

Office Action received for CO Patent Application No. NC2023/0004462, mailed on Jan. 20, 2026, 26 pages (13 pages of English Translation and 13 pages of Original Document).

* cited by examiner

DUAL PRESSURE PLANT FOR THE PRODUCTION OF NITRIC ACID AND METHOD FOR OPERATING SAME

FIELD OF THE DISCLOSURE

The disclosure relates to the field of nitric acid production, more in particular to a dual pressure plant operating with a high pressure bleacher unit and to a method for operating said dual pressure plant, in particular for the recovery of energy provided by the operation of such high pressure bleacher unit.

BACKGROUND OF THE DISCLOSURE

Pure nitric acid is a clear, colorless liquid with a strong odor. Nitric acid is produced in large quantities principally by catalytic oxidation of ammonia (Ostwald process). Ammonia is converted to nitric acid in two stages. The ammonia is first oxidized in an ammonia burner on platinum gauzes (commonly called ammonia convertor), producing nitric oxide (nitrogen monoxide) and water:

$$4NH_3(g)+5O_2(g) \rightarrow 4NO(g)+6H_2O(g) \qquad (1)$$

The reaction product from (1), nitric oxide (in this disclosure also called nitrogen monoxide (NO)), following cooling, is then oxidized to nitrogen dioxide (NO$_2$) and further to dinitrogen tetroxide N$_2$O$_4$(g) in an oxidation section:

$$2NO(g)+O_2(g) \rightarrow 2NO_2(g) \qquad (2)$$

$$2NO_2(g) \rightarrow N_2O_4(g) \qquad (3)$$

Cooling of nitrogen oxide gases is accomplished through heat exchange in a cooler condenser in which condensed nitric acid is separated from nitric oxide, nitrogen dioxide and dinitrogen tetroxide gases, collectively called NO$_x$ gases.

By absorption in water, following compression through a NO$_x$-gas compressor, nitrogen dioxide and dinitrogen tetroxide are converted to nitric acid and nitric oxide:

$$3NO_2(g)+H_2O(l) \rightarrow 2HNO_3(aq)+NO(g) \qquad (4)$$

$$3N_2O_4(g)+H_2O(l) \rightarrow 4HNO_3(aq)+2NO(g) \qquad (5)$$

Weak nitric acid which is up to 68% (azeotrope) is obtained. Through a rectification process the concentration of nitric acid can be increased up to 99% concentrated nitric acid. The total reaction is given by the following formula:

$$NH_3+2O_2 \rightarrow HNO_3+H_2O \qquad (6)$$

The main process units in a nitric acid production plant, include an ammonia converter (conversion of ammonia into nitric oxides using oxygen over a suitable catalyst), an oxidation section (conversion of nitric oxide into nitrogen dioxide and nitrogen tetroxide), an absorber unit (for the absorption of NO$_x$ gases into water) and a bleacher unit (removal of unreacted dissolved gases, containing in particular NO$_x$ and gases, from the aqueous nitric acid solution, which give it its typical brownish color).

The process for the production of nitric acid can be differentiated into a mono-pressure (single-pressure) and dual pressure (split-pressure) process.

In a mono-pressure process, the converter and the absorber unit operate at roughly the same working pressure. Such mono-pressure process generally includes low-pressure (2 to 6 bar) and high-pressure (6 to 16 bar, in particular 9 to 16 bar) processes.

In a dual pressure process, the absorber unit operates at a higher working pressure than the ammonia converter. Modern dual pressure processes feature a low-pressure (LP) ammonia convertor operating typically at 2 to 6 bar, and a high-pressure (HP) absorber unit operating at 9 to 16 bar.

A dual pressure process requires an air compressor to feed low-pressure air (which comprises about 21 vol % of oxygen) to the converter, and a NO$_x$-gas compressor to feed high-pressured NO$_x$ gases to the absorber unit. The working pressure of an air compressor is from 2 to 6 bar, inclusive, and the working pressure of a NO$_x$-gas compressor is from 9 to 16 bar, inclusive.

The drive power for both air and NO$_x$ gas compressor typically originates from a tail-gas turbine and a steam turbine or electric motor. Accordingly, the compressor train of a nitric acid production plant typically comprises an air compressor, a NO$_x$ gas compressor, a tail-gas turbine, and a steam turbine or electric motor.

More in detail, referring to FIG. 1, a dual pressure plant and process according to the prior art works as follows. Ammonia 10, optionally pre-heated in a pre-heater unit 1 is mixed with compressed air 13 in a mixing apparatus 3, pressured to a low pressure using an air compressor 2 operable at a low gas pressure, and the resulting ammonia/air mixture 14 is fed to an ammonia convertor 4, operating at a low pressure, where ammonia is oxidized over a suitable catalyst, thus obtaining a LP gaseous NO$_x$ gas/steam mixture 15, comprising water and NO. The heat of the mixture coming out of the ammonia convertor is recovered, after which the NO$_x$ gas/stream mixture is subsequently cooled down in a water cooler/condenser 9a to temperature where the water condenses, and an aqueous diluted nitric acid mixture 17 is separated from a gaseous NO$_x$ stream 18. In the subsequent oxidation stage 20, the LP gaseous NO$_x$ stream is further oxidized to further convert the NO to NO$_2$ and N$_2$O$_4$, and cooled down again in a cooler/separator 9b to separate out a aqueous diluted nitric acid mixture 21 which is directed to an absorber unit 6, commonly called absorption tower. On the other hand, the gaseous NO$_x$ stream 22 is send to a NO$_x$ gas compressor 5 wherein its pressure is elevated from a low pressure to a high pressure, being about equal to the absorber unit operating pressure, and the pressurized gaseous NO$_x$ stream 24 is sent to the absorber unit 6 too. Inside the absorber unit 6, the HP NO$_x$ gas reacts with water to produce a stream of raw nitric acid also containing residual NO$_x$ gas 27, which is fed to a bleacher 7 over a valve 31. The residual NO$_x$ gas is then stripped out with a gaseous medium 16 such as an oxygen-containing gas or air, inside a bleacher unit 7, operating at low pressure; the bleacher unit is generally operated at about the same pressure as the ammonia convertor. The NO$_x$-loaded stripping gas 19 is directed to the oxidation section, upstream of the NO$_x$ gas compressor 5. The stripped nitric acid stream 29 from the bleacher unit 7 is then sent to storage for further processing.

The drive power for both air compressor 2 and NO$_x$ gas compressor 5 originates from a tail-gas turbine 8 and a steam turbine or electric motor (not shown).

The air used for the oxidation of ammonia is commonly denoted as primary air; the air used as stripping medium in the bleacher unit is commonly denoted as secondary air.

According to the prior art, the revamping of the nitric acid production plants to increase its capacity is commonly based on increasing the amount of primary air to the reactor, which leads to a proportional increase of the amount of nitric acid produced.

The increase of the amount of primary air in the reactor entails the installation of a new air compressor or the revamping of the existing one. The increase of the primary air also causes a higher amount of gas to be processed into the subsequent $NO_x$ gas compressor, thus entailing the further revamping of the $NO_x$ gas compressor or the installation of a new one, and the modification or replacement of the tail-gas and/or the steam-turbines and/or the electrical motor. Otherwise, the $NO_x$ gas compressor would easily achieve its process limit, thus becoming the bottleneck of the plant.

However, the revamping has significant drawbacks. First of all, it entails elevated costs for the modification or replacement of the existing equipment, i.e. the air compressor, the $NO_x$ gas compressor and the corresponding turbines and electrical motor. In addition, the revamping of the equipment is also technically demanding leading to long plant downtime.

Another problem related to nitric acid production plants is the high amount of energy required in order to operate the $NO_x$ gas compressor. Consequently, a high amount of energy is required to achieve the targeted nitric acid production throughput.

Background Prior Art

In WO2018/162150A1 (Casale S A, 13 Sep. 2018) a solution is proposed to overcome the revamping drawbacks. WO2018162150A1 discloses a dual pressure plant for the production of nitric acid comprising a reactor providing a gaseous effluent containing nitrogen oxides, an absorber unit in which nitrogen oxides react with water providing raw nitric acid and, the absorber unit operating at a pressure greater than the pressure of the reactor, a compressor elevating the pressure of the reactor effluent to the absorber unit pressure, the plant also comprising a first HP bleacher unit and a second LP bleacher unit, the first HP bleacher unit stripping with air the $NO_x$ gas from the output stream of the absorber unit, thus providing a partially stripped nitric acid stream and a nitrogen oxides-loaded air stream, the former being fed to the second LP-bleacher unit and the latter being recycled to the oxidation section, upstream of the $NO_x$ gas compressor.

A further air compressor is also provided, which supplies the first HP bleacher unit with air. Hence, energy is required in order to operate a first HP bleacher unit at a high pressure and then recycle $NO_x$ gases to the delivery side of the $NO_x$ gas compressor.

Thus, there remains a need for a process and a corresponding plant setup for minimizing the amount of energy required in order to operate the $NO_x$ gas compressor and, preferably, also the air compressor, thereby avoiding bottlenecks in the nitric acid production throughput associated with those compressors.

SUMMARY OF THE DISCLOSURE

The goal of the disclosure is achieved with a dual pressure plant according to claim 1 and dependent claims 2 to 5, for the production of nitric acid.

The goal of the disclosure is further achieved by operating a high-pressure bleacher unit in a dual pressure nitric acid production plant, according to claim 6 and dependent claims 7 to 11.

The main embodiment of the disclosure has several advantages.

A first advantage is that, according to the disclosure, the $NO_x$ gas compressor is not loaded anymore by the $NO_x$-loaded stripping gas from the bleacher unit, as the $NO_x$ loaded stripping gas is directed to the downstream side of the $NO_x$ gas compressor, and combined with the HP gaseous NOx stream, thus requiring the $NO_x$ gas compressor to produce less work (for the same convertor throughput) or—put it differently—wherein the $NO_x$ gas compressor is able to handle an increased throughput of $NO_x$-loaded gas from the oxidation section (at an increased convertor throughput).

A second advantage is that the air compressor is now only pressurizing primary air for the convertor since the secondary air supply for the bleacher unit has now been replaced by a stream of an oxygen-rich gas provided at least partly by a high-pressure (HP) water electrolyser unit which is operated at a gas pressure of 9 to 30 bar, preferably 15 to 30 bar. As it requires less power to pump water than to compress gas, there is a significant overall energy savings. Furthermore, the air compressor is less loaded as it is only compressing primary air, thus requiring the air compressor to produce less work (for the same convertor throughput) or—put it differently—wherein the air compressor is able to handle an increased throughput of primary air (at an increased convertor throughput).

A third advantage is that the air compressor or the $NO_x$ gas compressor does not need to be replaced by one with a higher throughput, and a higher nitric acid production can be achieved by only rerouting some of the gas streams.

LIST OF FIGURES

FIG. 1: schematic representation of a dual pressure nitric acid production plant according to the state of the art.

Figure 2:
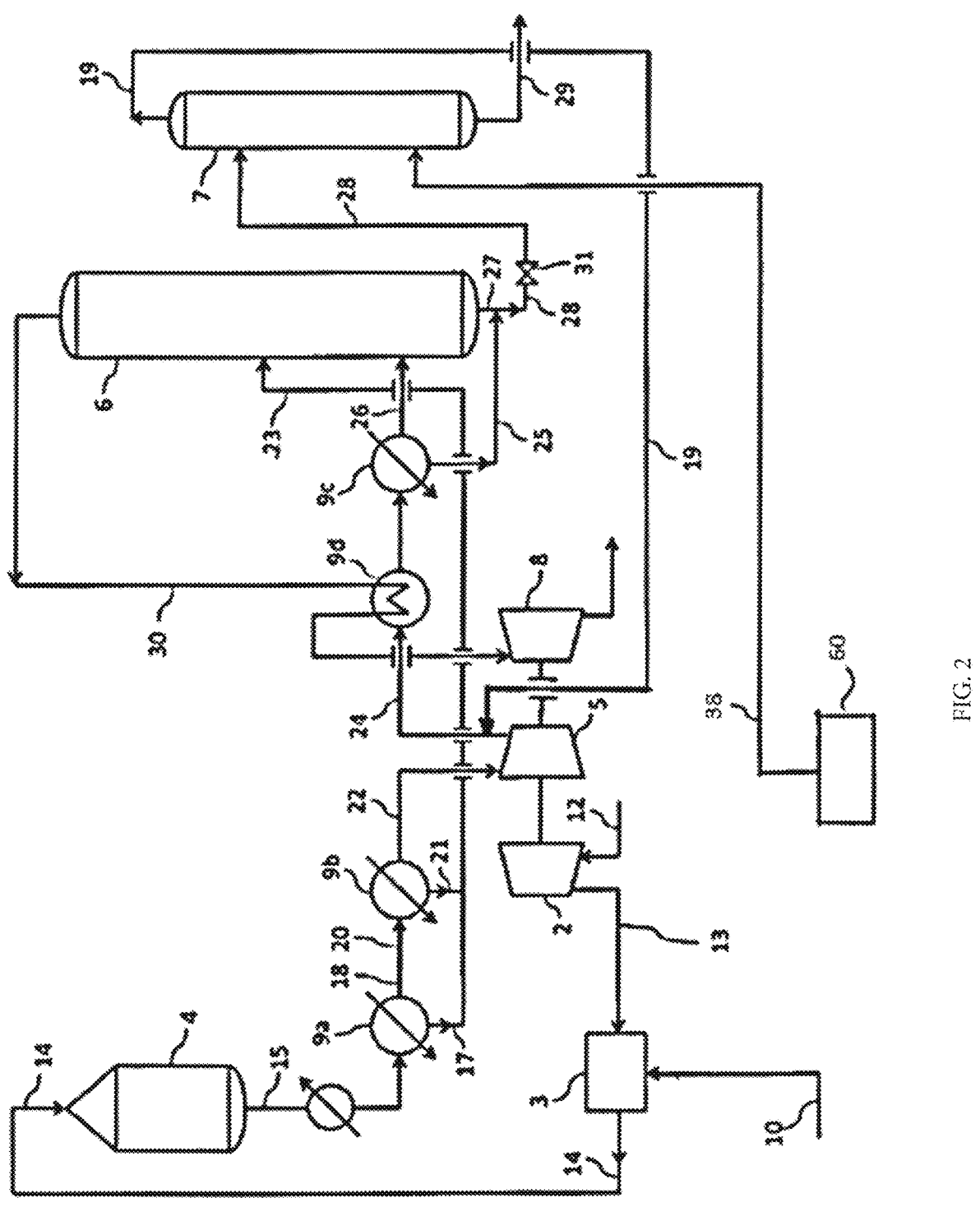

FIG. 2: schematic representation of a dual pressure nitric acid production plant according to the present disclosure involving the supply of an oxygen-rich gas to an HP bleacher unit of a dual pressure nitric acid production plant, wherein the $NO_x$-loaded stripping gas is directed to the discharge-side of the $NO_x$ compressor.

Figure 3:
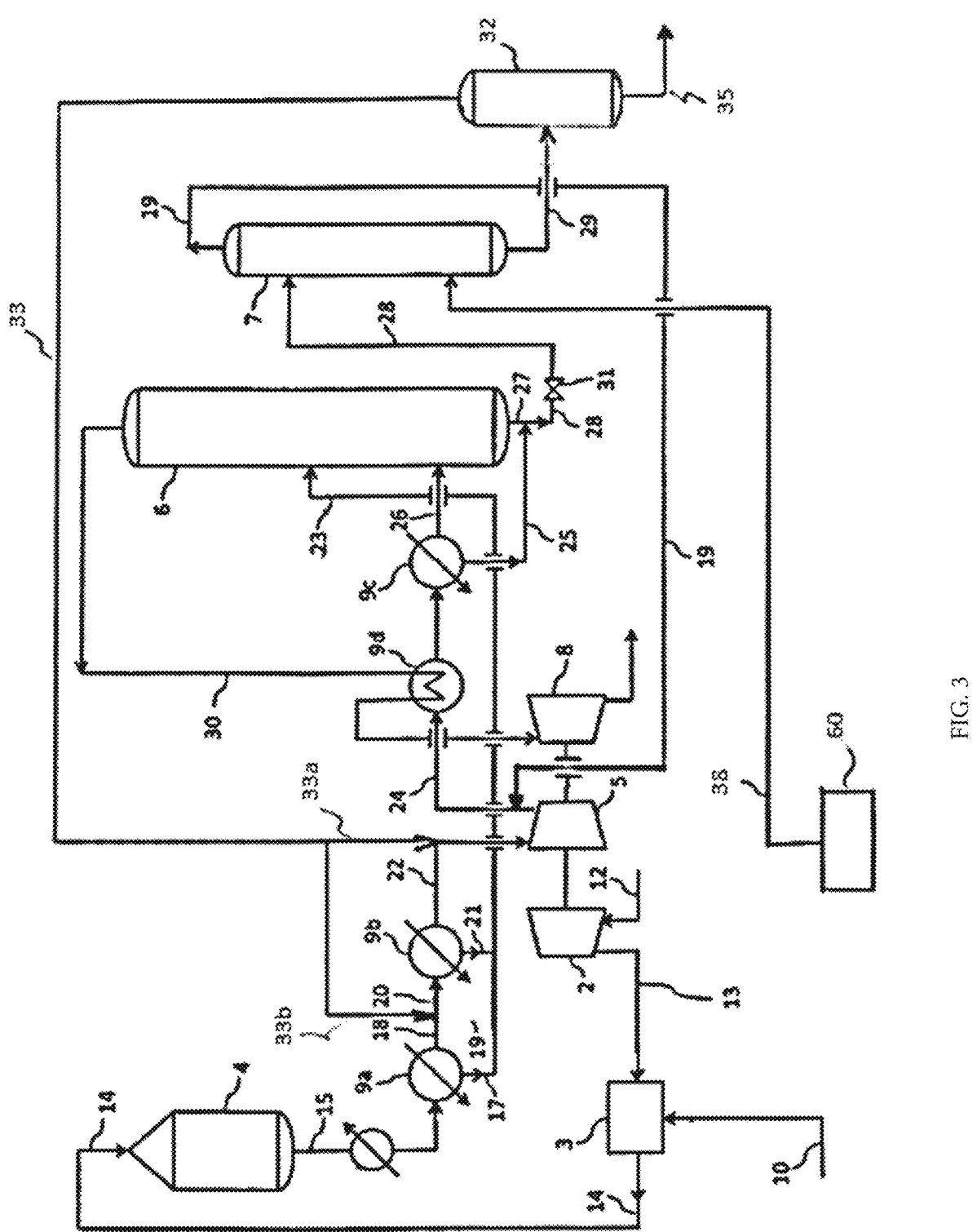

FIG. 3: schematic representation of a dual pressure nitric acid production plant according to the disclosure as depicted in FIG. 2, further involving a flash vessel.

Figure 4:
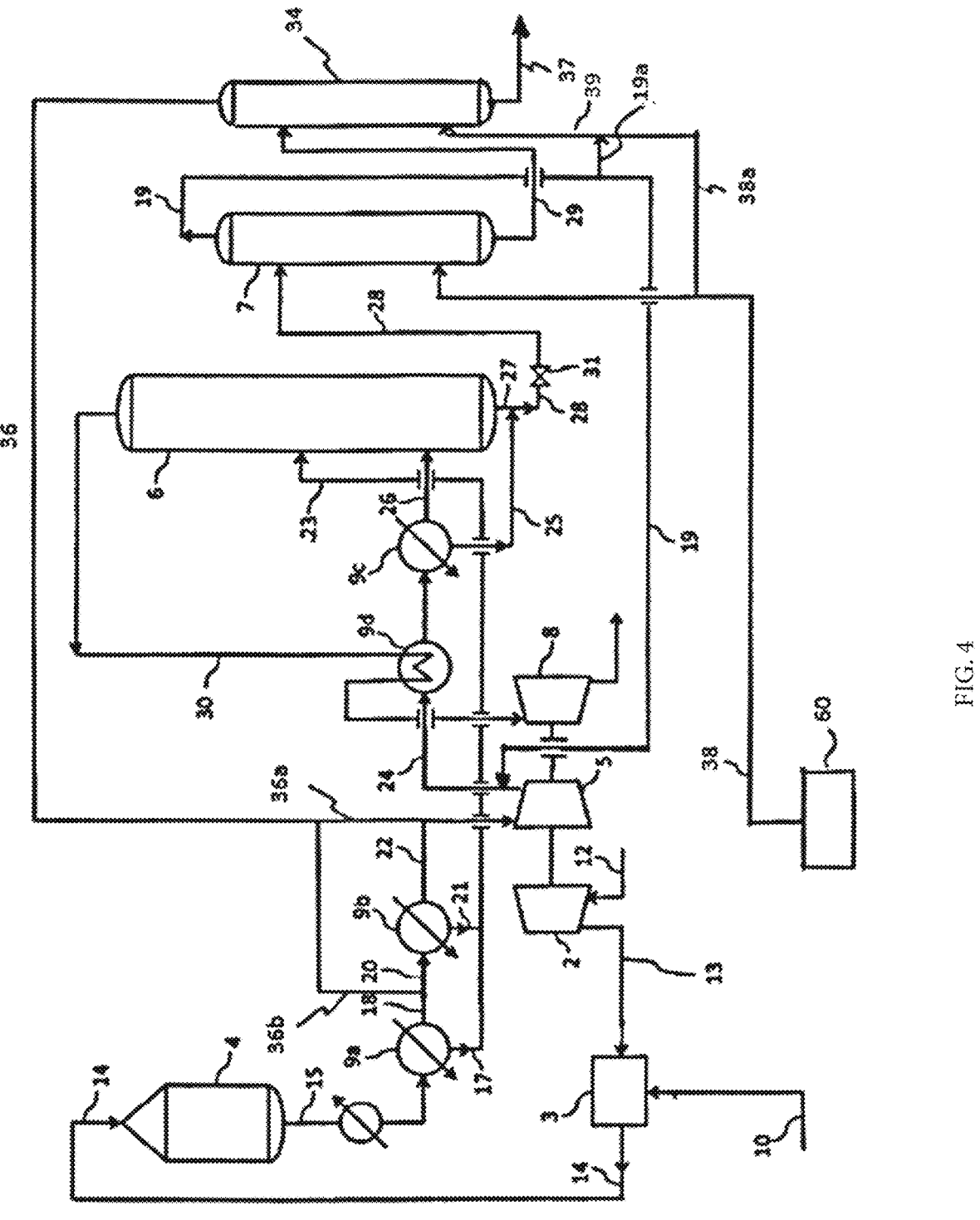

FIG. 4: schematic representation of a dual pressure nitric acid production plant according to the disclosure as depicted in FIG. 2, further involving a second, low pressure bleaching tower.

DETAILED DESCRIPTION OF THE DISCLOSURE

Throughout the description and claims of this specification, the words "comprise" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties, or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The enumeration of numeric values by means of ranges of figures comprises all values and fractions in these ranges, as well as the cited end points. The term "from . . . to . . . " as used when referring to a range for a measurable value, such as a parameter, an amount, a time period, and the like, is intended to include the limits associated to the range that is disclosed.

As defined herein, nitrogen oxides gases or $NO_x$ gases are assumed to comprise, as major $NO_x$ gas components, nitric oxide (NO), nitrogen dioxide ($NO_2$) and dinitrogen tetroxide gases ($N_2O_4$).

As defined herein, and unless explicitly defined otherwise for a specific case, a low pressure (LP) is defined as a pressure ranging from 2 to 6 bar, and a high pressure (HP) is defined as a pressure ranging from 9 to 16 bar. A low pressure is always lower than a high pressure.

As defined herein, and unless explicitly defined otherwise for a specific case, "means for directing" are defined as means selected from the group of tubes, pipes, channels, conduits, ducts, and the like, capable of directing a fluid from a point A to a point B, which points A and B may be defined explicitly or implicitly, depending on the specific case.

As defined herein, and unless explicitly defined otherwise for a specific case, "about" is defined as a variation of maximum 10% of the value considered. Hence, about 100 is defined as a value from 90 to 110. This accounts a.o. for measurement accuracy and clearance.

Nitric Acid Production Plant—Main Embodiment

According to a first aspect of the disclosure, and with reference to FIG. 2, a dual pressure plant for the production of nitric acid is provided. The plant comprises at least:

an air compressor 2, operable to pressurize air 12 to a pressure ranging from 2 bar to 6 bar (low pressure, LP);

a converter 4, operating at a low pressure (LP), operable to be fed with a stream of an ammonia/pressurized air mixture 14 at low pressure (LP), to oxidize the ammonia and to produce an LP gaseous $NO_x$ gas/steam mixture 15, comprising water and NO;

a $NO_x$ gas compressor 5, operable to elevate the pressure of a gaseous $NO_x$ stream 22 from a low pressure (LP) to a pressure ranging from 9 bar to 16 bar (high pressure, HP), resulting, at its downstream side, in a HP gaseous $NO_x$ stream 24 that is subsequently exchanging heat with the tail gas 30 at the heat exchanger 9d, resulting in the HP gaseous $NO_x$ stream 26;

an absorber unit 6, operating at a high pressure (HP), operable to react the nitrogen oxides contained in the HP gaseous $NO_x$ stream 26 with water, wherein the absorber unit 6 provides an output product stream 27 containing nitric acid and dissolved nitrogen oxides, and a tail gas 30; and a bleacher unit 7, operable to strip dissolved nitrogen oxides away from the output product stream 27 with a stripping medium 38, providing a stripped nitric acid stream 29 and a $NO_x$ loaded stripping gas 19, wherein:

the bleacher unit 7 operates at a high pressure (HP), which is about equal to the pressure at which the absorber unit 6 is operating;

the bleacher unit 7 is in fluid communication with a source of HP oxygen-rich gas 60, for providing the bleacher unit 7 with an HP oxygen-rich gas as a stripping medium 38; and the plant comprises means for directing the $NO_x$-loaded stripping gas 19 to the downstream side of the $NO_x$ gas compressor 5.

The plant according to the disclosure is characterised in that if further comprises:

a high-pressure (HP) water electrolyser (60), in fluid communication with the bleacher unit (7) for providing the high-pressure (HP) oxygen-rich gas to be used as the stripping medium (38), alone or mixed with pressured air or any other suitable gas.

As defined herein, an oxygen-rich gas is a gas comprising more oxygen than is on the average present in air. In particular, an oxygen-rich gas comprises more than 21 vol % of oxygen, more in particular more than 30 vol %, more than 40 vol %, more than 50 vol %, more than 60 vol %, more than 70 vol %, more than 80 vol %, more than 90 vol %, more than 95 vol %, and more than 99 vol %, more in particular comprises about 100 vol % of oxygen.

The oxygen-rich gas differs from the gas used in the prior art in that it contains more oxygen, in particular more than 21 vol % of oxygen.

The oxygen-rich gas may be obtained from mixing oxygen with air or any other gas, suitable for its primary purpose, i.e. as a stripping medium in a bleacher unit.

As defined herein, the bleacher unit 7 can be any bleacher unit known in the prior art, such as, but not restricted to, a sieve tray bleacher unit, a random packing bleacher unit, or a structured packing bleacher unit.

This main embodiment of the disclosure has several advantages, of which the most apparent have been listed below.

By directing the $NO_x$-loaded stripping gas 19 to the downstream side of the NO, gas compressor 5, the compressor is not loaded anymore by the $NO_x$-loaded stripping gas, thus requiring the $NO_x$ gas compressor to produce less work (for the same convertor throughput). Hence, the $NO_x$ gas compressor is able to handle an increased throughput of $NO_x$-loaded gas from the oxidation section (at an increased convertor throughput).

By using a separate source of oxygen-containing gas, other than air, in this case oxygen-rich gas, the air compressor 2 is now only pressurizing primary air for the convertor since the secondary air supply for the bleacher unit has now been replaced by a stream of an oxygen-rich gas from an HP oxygen-rich gas source provided at least partly by an HP water electrolyser unit, particularly a water electrolyser unit which is operated at a gas pressure of 30 bar. As it requires less power to pump water than to compress gas, there is a significant overall energy savings. Furthermore, the air compressor is less loaded as it is only compressing primary air, thus requiring the air compressor to produce less work (for the same convertor throughput). Hence, the air compressor is able to handle an increased throughput of primary air (at an increased convertor throughput).

A water electrolyser is a device for the electrolysis of water, being the decomposition of water into oxygen and hydrogen gas, due to the passage of an electric current there through. This technique can be used to make hydrogen gas, a main component of hydrogen fuel, and breathable oxygen gas.

A suitable high pressure water electrolyser may be comprised of:

an anode producing oxygen gas according to the reaction $$2OH^-=H_2O+\tfrac{1}{2}O_2+2e^-;$$

a cathode, producing hydrogen gas according to the reaction $$2H_2O+2e^-=H_2+2OH^-;$$

an electrolyte consisting of an alkaline solution such as potassium hydroxide; and a porous diaphragm separating the anode and the cathode, in order to avoid the mixing of hydrogen gas and oxygen gas that together form an explosive mixture. Alternatively, the anode and the cathode may be separated by a solid polymer electrolyte such as the fluoropolymer Nafion, where the electrolyte provides the selective transport of protons from the anode to the cathode, as well as the electrical insulation between the anode and the cathode, and avoids the mixing of hydrogen gas and oxygen gas that together form an explosive mixture.

The anode and cathode can be made of nickel or steel, or mixtures thereof. Alternatively, for the purpose of enhancing the electrode reactions, the anode and cathode may contain catalysts that can be made of Iridium and Platinum, respectively. The diaphragm of an electrically insulating material is based on, for example, zirconia. The diaphragm has a porosity such that it forms a barrier against transport of hydrogen and oxygen gas bubbles, while containing a continuum of penetrated liquid electrolyte.

An anode-diaphragm-cathode assembly constitutes an electrolysis cell. Electrolysis cells are piled in series in stacks that compose the core of an electrolyser. The hydrogen and oxygen production for a given stack volume is proportional to the current density and inversely proportional to the stacking distance. Regardless of stack volume, the hydrogen and oxygen production is proportional to the total current.

In addition to the stack, the electrolyser comprises auxiliaries such as a current rectifier, a water demineralization unit, a water pump and a cooling system, a hydrogen purification unit, and instrumentation.

The electrolyser is operated by applying a voltage corresponding to the standard potential plus the overpotential over each cell. The total voltage depends on the total number of cells of which the electrolyser is comprised. OH— ions generated at the cathode migrate through the electrolyte in the diaphragm to the anode, where they are consumed by the anode reaction. Electrons travel the opposite direction in an external circuit.

The electrolyser may be operated at a temperature of 50 to 80° C., or 60 to 80° C., and a gas pressure of 9 to 30 bar, preferably 15 to 30 bar.

According to a specific embodiment of the disclosure, the stripping medium 38 may be conditioned to a temperature ranging from ambient temperature to 120° C., or from 50° C. to 120° C., or from 80° C. to 120° C., or from 90 to 120° C., before it is directed into the bleacher unit 7. Bleaching of nitric acid in a bleacher unit in a nitric acid plant generally may be conditioned such that the temperature of the nitric acid is in the range of 30 to 60° C. (as measured inside the bleacher). By pre-conditioning the oxygen gas, the bleaching efficiency achieved in the bleacher 7 will be increased.

Therefore, according to a specific embodiment, the plant according to the disclosure further comprises means (not shown) for heating the stripping medium 38, such as, but not limited to, a pre-heater or a heat exchange system.

According to a specific embodiment of the disclosure, the bleacher unit 7 is a vertical bleaching tower, comprising:

a structured packing; and a liquid distributor comprising a feed box having a serrated weir for distribution of the output product stream 27 comprising dissolved nitrogen oxides through upward-pointing serrations of the serrated weir into perforated trays of the liquid distributor and located above the structured packing for distributing the aqueous nitric acid solution comprising the dissolved nitrogen oxides to the structured packing.

The above design of the bleacher unit has distinct advantages. The bleaching tower is a known restriction unit (bottle neck) in the nitric acid production. The problem is to meet the specifications of the product acid at high load. In general, the design of the column should ensure uniform distribution and contact between the upward flowing gas (stripping medium) and the downward liquid stream (aqueous nitric acid solution) through the entire column. The advantage of the specific design is that an increased nitric acid production capacity and a reduction of the amount of stripping gas used, can be obtained, while at least maintaining the quality of the aqueous nitric acid solution, i.e. the low level of dissolved nitrogen oxide gases.

Preferably, the structured packing has a surface area of at least 250 m²/m³, preferably 450-750 m²/m³.

Preferably, the liquid distributor has a drip-point density of at least 30 dripping points per m², preferably from 60 to –200 dripping points per m².

Preferably, the ratio between the height of the structured packing and the vertical bleaching tower diameter is at least 1, preferably at least 1.5, more preferably at least 2.

Preferably, the stripping gas is an oxygen-rich gas, moving in a counter-current direction to the acid solution, i.e. the output product stream 27 and is in an air/acid solution ratio of lower than 75 m³ air/m³ acid solution, preferably lower than 45 m³ air/m³ acid solution, more preferably lower than 30 m³ air/m³ acid solution, even more preferably lower than 20 m³ air/m³ acid solution.

Preferably, the pressure drop over the vertical bleaching tower is between 25 mbar and 65 mbar.

Nitric Acid Production Plant—Second Embodiment

According to a second embodiment of the disclosure, and with reference to FIG. 3, the plant according to the main embodiment further comprises a flash vessel 32 in fluid communication with the bleacher unit 7, wherein the flash vessel 32 comprises:

an inlet for the stripped nitric acid stream 29 in fluid communication with the bleacher unit 7; wherein the stripped nitric acid stream 29 is quickly reduced in pressure (flashed) from a high pressure (HP) to a low pressure (LP), in particular to a pressure corresponding to an upstream section of the $NO_x$ gas compressor 5;

a first outlet for gases 33 produced in the flash vessel 32, in fluid communication with an upstream section of the $NO_x$ gas compressor 5; and a second outlet for collecting the flashed nitric acid stream 35 from the flash vessel 32.

Using the above embodiment, the pressure of the stripped nitric acid stream 29 is rapidly reduced, and the dissolved gases, containing in particular $NO_x$ and oxygen gases, are evacuated from the stripped nitric acid stream 29.

The above disclosed embodiment has several advantages, of which the most apparent have been listed below.

A first advantage is that the quality of the stripped nitric acid stream 29 can be improved, in the sense that it contains less dissolved gases, in particular $NO_x$ and oxygen gases. In addition, by flashing the stripped nitric acid stream 29 coming out of the bleacher unit 7, the amount of oxygen gases that will be released when the stripped nitric acid stream 29 is flashed down to atmospheric pressure in the storage tank, may be reduced. A high concentration of oxygen forces the equilibrium for nitric oxide↔nitrogen dioxide towards nitrogen dioxide, which results in brown gas emissions from the ventilation system of the storage tank. Hence, flashing of the stripped nitric acid stream 29 downstream the bleaching tower 7 and prior to storing the nitric acid product, can result in less brown gas emissions coming out of the ventilation system of the product storage tank.

A second advantage is that the gases 33*b* can be used to further improve the oxidation process in the oxidation stage 20, which is part of the upstream section of the $NO_x$ gas compressor 5, when they are (partly) directed to a point upstream of the water cooler/condenser 9*a*. The gases 33*a* may also be (partly) directed to a point directly upstream of the $NO_x$ gas compressor 5, where they do not contribute to the oxidation in the oxidation stage 20, but are compressed again to a high pressure (HP) to be fed to the absorber 6. The feasibility of this recycle loop for the gases 33*a* is supported by the increased capacity of the $NO_x$ gas compressor 5, compared to the prior art embodiment.

A third advantage is that, by using an oxygen-rich gas as stripping medium 38, the $NO_x$-loaded stripping gas 33 has a much higher oxygen content than the $NO_x$-loaded stripping gas according to the prior art. This will benefit the oxidation in the oxidation stage 20, providing a more effective oxidation of the gaseous $NO_x$ stream 18. As a result, the tail gas 30 from the absorber 6 will be cleaner and less work will be required from a DeNOx unit (not shown) for treating the tail gas 30.

Nitric Acid Production Plant—Third Embodiment

According to a third embodiment of the disclosure, and with reference to FIG. 4, the plant according to the main embodiment further comprises a second bleacher unit 34, in addition to the first bleacher unit 7, said second bleacher unit 34 comprising:

a first inlet for the stripped nitric acid stream 29 in fluid communication with the bleacher unit 7;

a second inlet for a stripping gas stream 39;

a first outlet for a $NO_x$-loaded stripping gas stream 36 in fluid communication with an upstream section of the NO, gas compressor 5; and a second outlet for collecting the bleached nitric acid stream 37 from the second bleacher unit 34;

wherein the second bleacher unit 34 operates at a low pressure (LP), which is lower than the pressure at which the bleacher unit 7 is operating;

the second bleacher unit 34 is in fluid communication with a source of HP oxygen-rich gas 38*a*, for providing the second bleacher unit 34 with an HP oxygen-rich gas as a stripping medium; and/or is in fluid communication with the $NO_x$-loaded stripping gas 19*a* from the bleacher 7, for providing the second bleacher unit 34 with an HP oxygen-rich gas as a stripping medium; according to a further embodiment, there is no connection 19*a*, or the flow 19*a* is regulated to be zero (no mass flow).

the plant comprises means for directing the $NO_x$-loaded stripping gas stream 36 to the upstream side of the $NO_x$ gas compressor 5.

As defined herein, the second bleacher unit 34 can be any bleacher unit known in the prior art, such as, but not restricted to, a sieve tray bleacher unit, a random packing bleacher unit or a structured packing bleacher unit.

The above disclosed embodiment has several advantages, of which the most apparent have been listed below.

A first advantage is that, according to the findings of the inventors, the total amount of air consumed by the combination of the bleachers 7 and 34 is reduced with respect to the air consumption by the nitric acid plant according to the first embodiment of the disclosure, in which only bleacher 7 is used.

A second advantage is that the quality of the stripped nitric acid stream 37 is improved, in the sense that it contains less dissolved gases, in particular $NO_x$ and oxygen gases.

A third advantage is that the gases 36*b* can be used to further improve the oxidation process in the oxidation stage 20, which is part of the upstream section of the $NO_x$ gas compressor 5, when they are (partly) directed to a point upstream of the water cooler/condenser 9*a*. The gases 36*a* may also be (partly) directed to a point directly upstream of the $NO_x$ gas compressor 5, where they do not contribute to the oxidation in the oxidation stage 20, but are compressed again to a high pressure (HP) to be fed to the absorber 6. The feasibility of this recycle loop for the gases 36*a* is supported by the increased capacity of the $NO_x$ gas compressor 5, compared to the prior art embodiment.

A fourth advantage is that, by using an oxygen-rich gas 38*a*, 19*a* as stripping medium, the $NO_x$-loaded stripping gas 36 has a much higher oxygen content than the $NO_x$-loaded stripping gas according to the prior art. This will benefit the oxidation in the oxidation stage 20, providing a more effective oxidation of the gaseous $NO_x$ stream 18. As a result, the tail gas 30 from the absorber 6 will be cleaner and less work will be required from a DeNOx unit (not shown) for treating the tail gas 30.

In addition, by further stripping the stripped nitric acid stream 29 coming out of the bleacher unit 7, the amount of oxygen that will be released when the stripped nitric acid stream 29 is flashed down to atmospheric pressure in the storage tank, is reduced. A high concentration of oxygen forces the equilibrium for nitric oxide↔nitrogen dioxide towards nitrogen dioxide, which results in brown gas emissions from the ventilation system of the storage tank. Hence, further stripping of the stripped nitric acid stream 29 downstream the bleaching tower 7 and prior to storing the nitric acid product, results in less brown gas emissions coming out of the ventilation system of the product storage tank.

According to a specific embodiment of the disclosure, the second bleacher unit 34 is a vertical bleaching tower, comprising:

a structured packing; and a liquid distributor comprising a feed box having a serrated weir for distribution of the output product stream 29 from the first HP bleacher 7 comprising dissolved nitrogen oxides through upward-pointing serrations of the serrated weir into perforated trays of the liquid distributor and located above the structured packing for distributing the aqueous nitric acid solution comprising the dissolved nitrogen oxides to the structured packing.

In particular, for the second bleacher unit 34, the same parameters apply as for the bleaching tower 7.

Method for Operating a High-Pressure Bleacher Unit

According to a second aspect of the disclosure, a method is provided for operating a high-pressure bleacher unit in a plant according to the disclosure, comprising the steps of:

a) operating the bleacher unit 7 at a high pressure (HP), which is about equal to the pressure at which the absorber unit 6 is operating;

b) providing the bleacher unit 7 with an HP oxygen-rich gas as a stripping medium 38; and c) directing the $NO_x$-loaded stripping gas 19 to the downstream side of the $NO_x$ gas compressor 5.

As defined herein, the bleacher unit 7 can be any bleacher unit known in the prior art, such as, but not restricted to, a sieve tray bleacher unit, a random packing bleacher unit or a structured packing bleacher unit.

By operating according to the method of the disclosure, the inventors have now found that it is possible to reduce the work of a gas compressor, such as an air compressor or a $NO_x$ gas compressor, in a dual pressure nitric acid production plant, by utilizing the energy available from pressurized gas, more specifically $NO_x$-loaded stripping gas from the bleacher unit. Indeed, by redirecting the pressurized gas downstream a $NO_x$ gas compressor, less work is required from the $NO_x$ gas compressor. In addition, the concept increases the convertor throughput and the nitric acid production rate in plants where the air compressor or the $NO_x$ gas compressor is a bottleneck.

According to one embodiment of the method of the disclosure, the HP oxygen-rich gas comprises more than 21 vol % of oxygen, in particular more than 95 vol % of oxygen.

According to one embodiment of the method of the disclosure, the HP oxygen-rich gas is provided by a high-pressure water electrolyser. It has been found that an improvement can be achieved by utilizing oxygen that already is pressurized. Indeed, the oxygen produced by a water electrolyser operating at higher pressure will be pressurized. Operating the water electrolyser at high pressure requires to pump water to the water electrolyser at a high pressure. However, pumping a liquid, in particular water, to a water electrolyser requires significantly less power than the compression of an oxygen-containing gas, in particular air, for use in a dual pressure nitric acid production plant. Hence, the integration of a high pressure water electrolyser with a dual pressure nitric acid production plant, in which pressurized oxygen is supplied to the dual pressure nitric acid production plant, provides a large benefit in the form of energy saving associated with the compression of the oxygen-rich gas before its introduction in the dual pressure nitric acid production plant.

As defined herein, the oxygen-containing gas is the oxygen-rich gas provided by the water electrolyser unit or a mixture of the oxygen-rich gas provided by the water electrolyser unit and air compressed by the air compressor.

According to one embodiment of the method of the disclosure, the method further comprises the step of:

d) pre-heating the HP oxygen-rich gas as a stripping medium 38 to a temperature ranging from ambient temperature to 120° C., or from 50° C. to 120° C., or from 80° C. to 120° C., or from 90 to 120° C.

Bleaching of nitric acid in a bleacher unit in a nitric acid plant generally may be performed such that the temperature of the nitric acid is in the range of 30 to 60° C. (as measured inside the bleacher). By pre-conditioning the oxygen gas, the bleaching efficiency achieved in the bleacher 7 will be increased.

According to one embodiment of the method of the disclosure, the method further comprises, in a plant according to the second embodiment, the steps of:

e) flashing the stripped nitric acid stream 29 from a high pressure (HP) to a low pressure (LP); and f) directing gases 33 produced in the flash vessel 32, to an upstream section of the $NO_x$ gas compressor 5.

Flashing of the stripped nitric acid stream 29 improves the bleaching of this nitric acid stream by removing additional dissolved nitrogen oxides gases and allows for the recovery and reuse of oxygen gas, originally provided to the bleacher unit 7. The recovered oxygen can be recycled to either the ammonia burner 4, the oxidation stage 20, or the absorber unit 6. When oxygen is recycled to the ammonia burner 4 or the oxidation stage 20, the oxidation of ammonia to nitric oxide and the oxidation of nitric oxide to nitrogen dioxide and dinitrogen tetroxide will be respectively increased. When recycled to the absorber unit 6 (after being pressurized in the $NO_x$ gas compressor 5) the efficiency of the absorption in the absorber unit 6 will be increased through increased conversion of nitric oxide to nitrogen dioxide and dinitrogen tetroxide. As a result of the recycling of the recovered oxygen to either the ammonia burner 4, the oxidation stage 20 or the absorber unit 6, the tail gas 30 from the absorber 6 will be cleaner and less work will be required from a DeNOx unit (not shown) for treating the tail gas 30. In addition, by flashing the stripped nitric acid stream 29 coming out of the bleacher unit 7, the amount of oxygen that will be released when the stripped nitric acid stream 29 is flashed down to atmospheric pressure in the storage tank, is reduced. A high concentration of oxygen forces the equilibrium for nitric oxide↔nitrogen dioxide towards nitrogen dioxide, which results in brown gas emissions from the ventilation system of the storage tank. Hence, flashing of the stripped nitric acid stream 29 downstream the bleaching tower 7 and prior to storing the nitric acid product, results in less brown gas emissions coming out of the ventilation system of the product storage tank.

According to another embodiment of the method of the disclosure, the method further comprises, in a plant according to the third embodiment, the steps of:

g) operating a second bleacher unit 34 at a low pressure (LP), which is lower than the pressure at which the bleacher unit 7 is operating;

h) providing the second bleacher unit 34 with an HP oxygen-rich gas as a stripping medium 38; and i) directing the $NO_x$-loaded stripping gas 36 to the upstream side of the $NO_x$ gas compressor 5.

Stripping of the stripped nitric acid stream 29 improves the bleaching of this nitric acid stream by removing additional dissolved nitrogen oxides gases and allows for the recovery and reuse of oxygen gas, originally provided to the bleacher unit 7. The recovered oxygen can be recycled to either the ammonia burner 4, the oxidation stage 20, or the absorber unit 6. When oxygen is recycled to the ammonia burner 4 or the oxidation stage 20, the oxidation of ammonia to nitric oxide and the oxidation of nitric oxide to nitrogen dioxide and dinitrogen tetroxide will be respectively increased. When recycled to the absorber unit 6 (after being pressurized in the $NO_x$ gas compressor 5) the efficiency of the absorption in the absorber unit 6 will be increased through increased conversion of nitric oxide to nitrogen dioxide and dinitrogen tetroxide. As a result of the recycling of the recovered oxygen to either the ammonia burner 4, the oxidation stage 20 or the absorber unit 6, the tail gas 30 from the absorber 6 will be cleaner and less work will be required from a DeNO$_x$ unit (not shown) for treating the tail gas 30. In addition, by stripping the stripped nitric acid stream 29 coming out of the bleacher unit 7, the amount of oxygen that will be released when the stripped nitric acid stream 29 is flashed down to atmospheric pressure in the storage tank, is reduced. A high concentration of oxygen forces the equilibrium for nitric oxide⇔nitrogen dioxide towards nitrogen dioxide, which results in brown gas emissions from the ventilation system of the storage tank. Hence, flashing of the stripped nitric acid stream 29 downstream the bleaching tower 7 and prior to storing the nitric acid product, results in less brown gas emissions coming out of the ventilation system of the product storage tank.

Use

According to a third aspect of the disclosure, the use of any embodiment of a dual pressure nitric acid production plant according to the disclosure, for recovery of energy from a high-pressure bleacher unit operating in the dual pressure nitric acid production plant, is disclosed. In particular, the use of any embodiment of a dual pressure nitric acid production plant according to the disclosure, for providing energy savings in the dual pressure nitric acid production plant, specifically by supplying pressurized oxygen from a high pressure water electrolyser to a high-pressure bleacher unit operating in said dual pressure nitric acid production plant, is disclosed.

EXAMPLES

Example 1

Reference is made to FIG. 2.

The absorber unit was operated at a pressure ranging from 11.9 bar to 12.0 bar. Pressurized oxygen gas 38 from an external, pressurized HP water electrolyser system 60 was fed into the nitric acid bleacher unit 7 as the stripping medium. The NO$_x$-loaded stripping gas 19 was redirected downstream to the NO$_x$ gas compressor 5. Since the bleacher unit 7 operated at a pressure level of NO$_x$ gas compressor outlet, the gases from the bleacher unit 7, containing nitrogen oxides gases, could be injected downstream the NO$_x$ gas compressor 5. Compression work in the air compressor was reduced by 31.8 kWh/t 100% nitric acid. Compression work in the NO$_x$ gas compressor was reduced by 6 kWh/t 100% nitric acid without any impact on the emissions from the nitric acid storage tank.

Example 2

Reference is made to FIG. 3.

The absorber unit was operated at a pressure ranging from 11.9 bar to 12.0 bar. In addition to the process described under Example 1, the nitric acid produced from the high-pressure bleacher unit 7 was flashed down into a flash-vessel 32. The flash-vessel contained a separation device to ensure that the gas and liquid phase were well separated. By flashing, the pressure was reduced to a pressure substantially equal to the pressure upstream the low-pressure cooler condenser 9b or upstream the nitrogen oxides gas compressor 5. The gases 33 from the flash vessel 32 were then directed to either upstream the low-pressure cooler condenser 9b or upstream the nitrogen gas compressor 5. Compression work in the air compressor was reduced by 31.8 kWh/t 100% nitric acid. Compression work in the NO$_x$ gas compressor was reduced by 6 kWh/t 100% nitric acid without any impact on the emissions from the nitric acid storage tank. From simulations, NO$_2$ emissions in the ventilation system of the nitric acid product storage tank (not shown) were reduced by 50 to 60% with respect to example 1.

Example 3

Reference is made to FIG. 4.

The absorber unit was operated at a pressure ranging from 11.9 bar to 12.0 bar. In addition to the process described under Example 1, the stripped nitric acid stream 29 from the high-pressure bleacher unit 7 was flashed down through a valve (not shown) into a low-pressure bleacher unit 34. The low-pressure bleacher unit 34 operated at a pressure of 5 bar that the gas 36 from the low-pressure bleacher unit 34 could be returned to the oxidation stage 20 upstream the low-pressure cooler condenser 9b or upstream the NO$_x$ gas compressor 5. The low-pressure bleacher unit 34 was operated partly by oxygen produced from a high-pressure water electrolyser 60 and provided as stream 38a, and partly by the NO$_x$-loaded stripping gas from the bleaching tower 7, provided as stream 19a. Compression work in the air compressor was reduced by 31.9 kWh/t 100% nitric acid. Compression work in the NO$_x$ gas compressor was reduced by 6 kWh/t 100% nitric acid without any impact on the emissions from the nitric acid storage tank.

Example 4

Reference is made to FIG. 4.

The absorber unit was operated at a pressure ranging from 11.9 bar to 12.0 bar. In addition to the process described under Example 1, the stripped nitric acid stream 29 from the high-pressure bleacher unit 7 was flashed down through a valve (not shown) into a low-pressure bleacher unit 34. The low-pressure bleacher unit 34 operated at such a pressure that the gas 36 from the low-pressure bleacher unit 34 could be returned to the oxidation stage 20 upstream the low-pressure cooler condenser 9b or upstream the NO$_x$ gas compressor 5. The low-pressure bleacher unit 34 was operated by oxygen produced from a high-pressure water electrolyser 60 and provided as stream 38a. The gases, expanded over suitable valves, increased in volume due to the reduced pressure in the low-pressure bleacher unit 34 and contributed to an improved bleaching of the nitric acid product stream 37. Compression work in the air compressor was reduced by 31.9 kWh/t 100% nitric acid. Compression work in the NO$_x$ gas compressor was reduced by 16.2 kWh/t 100% nitric acid without any impact on the emissions from the nitric acid storage tank. In addition, from simulations, a reduction of 6.8% in the amount of bleaching air required in Example 1 was observed.

LIST OF REFERENCE NUMERALS

| 1 | Ammonia pre-heater unit | | |
|---|---|---|---|
| 2 | LP air compressor | 19, 19a | NO$_x$-loaded stripping gas |
| 3 | Mixing apparatus | 20 | Oxidizing section |
| 4 | Ammonia burner (convertor) | 24, 26 | HP NO$_x$-containing stream |
| 5 | NOx-gas compressor | 27 | Absorber output stream |
| 6 | Absorber unit | 29 | HP Bleacher output stream |
| 7 | Bleacher unit | 30 | Absorber tail gas |

-continued

| 8 | Tail gas turbine | 31 | Valve |
| 9a | Water cooler condenser | 32 | Flash vessel |
| 9d | Tail gas heater | 33, 33a, 33b | $NO_x$-effluent bleacher stream |
| 9b, 9c | Water cooler/condenser | 34 | LP Bleacher unit |
| 10 | Ammonia stream | 35 | Flash vessel output stream |
| 11 | Pre-heated ammonia stream | 36, 36a, 36b | $NO_x$-loaded stripping gas stream |
| 12 | Air stream | 37 | LP Bleacher output stream |
| 14 | Convertor input stream | 38, 38a | HP oxygen stream |
| 15 | Convertor output stream | 39 | Stripping gas stream |
| 17, 21, 23, 25, 28 | Liquid nitric acid stream | 60 | Source of HP oxygen-rich gas, in particular an HP water electrolyser |
| 18, 22 | $NO_x$-gases containing stream | | |

We claim:

1. A dual pressure plant for the production of nitric acid, comprising:
   an air compressor, operable to pressurize air to a pressure ranging from 2 bar to 6 bar (low pressure, LP);
   a converter, operating at the low pressure (LP), operable to be fed with a stream of an ammonia/pressurized air mixture at the low pressure (LP), to oxidize the ammonia and to produce an LP gaseous $NO_x$ gas/steam mixture, comprising water and NO;
   a $NO_x$ gas compressor, operable to elevate the pressure of a gaseous $NO_x$ stream from
   the low pressure (LP) to a pressure ranging from 9 bar to 16 bar (high pressure, HP), resulting, at its downstream side, in an HP gaseous $NO_x$ stream;
   an absorber unit, operating at the high pressure (HP), operable to react the nitrogen oxides contained in the HP gaseous $NO_x$ stream with water, wherein the absorber unit provides an output product stream containing nitric acid and dissolved nitrogen oxides, and a tail gas; and
   a bleacher unit, operable to strip dissolved nitrogen oxides away from the output product stream with a stripping medium, providing a stripped nitric acid stream and a $NO_x$-loaded stripping gas;
   wherein
   the bleacher unit operates at the high pressure (HP), which is about equal to the pressure at which the absorber unit is operating;
   the bleacher unit is in fluid communication with a source of high pressure (HP) oxygen-rich gas, for providing the bleacher unit with the high pressure (HP) oxygen-rich gas, comprising more than 21 vol % oxygen, as a stripping medium;
   the plant comprising means for directing the $NO_x$-loaded stripping gas to the downstream side of the $NO_x$ gas compressor;
   the plant being characterised in that it further comprises
   a high pressure (HP) water electrolyzer, operating at a gas pressure of at least 9 bar, in fluid communication with the bleacher unit for providing the high pressure (HP) oxygen-rich gas having a pressure ranging from 9 bar to 16 bar to be used as the stripping medium, alone or mixed with pressured air or any other suitable gas.

2. The plant according to claim 1, further comprising a flash vessel in fluid communication with the bleacher unit, comprising:
   an inlet for the stripped nitric acid stream in fluid communication with the bleacher unit;

wherein the stripped nitric acid stream is flash reduced in pressure from the high pressure (HP) to the low pressure (LP);
   a first outlet for gases produced in the flash vessel, in fluid communication with an upstream section of the $NO_x$ gas compressor; and
   a second outlet for collecting the flashed nitric acid stream from the flash vessel.

3. The plant according to claim 1, further comprising a second bleacher unit, comprising:
   a first inlet for the stripped nitric acid stream in fluid communication with the bleacher unit;
   a second inlet for a stripping gas stream;
   a first outlet for a $NO_x$-loaded stripping gas stream in fluid communication with an upstream section of the $NO_x$ gas compressor; and
   a second outlet for collecting the bleached nitric acid stream from the second bleacher unit;
   wherein
   the second bleacher unit operates at the low pressure (LP), which is lower than the pressure at which the bleacher unit is operating;
   the second bleacher unit is in fluid communication with a source of HP oxygen-rich gas, for providing the second bleacher unit with an HP oxygen-rich gas as a stripping medium; and
   the plant comprises means for directing the $NO_x$-loaded stripping gas to the upstream side of the $NO_x$ gas compressor.

4. The plant of claim 1, wherein the HP oxygen-rich gas comprises more than 95 vol % of oxygen.

5. The plant of claim 1, wherein the water electrolyzer operates at a gas pressure of 9 bar to 30 bar.

6. A method for operating a high pressure bleacher unit in a plant comprising:
   an air compressor, operable to pressurize air to a pressure ranging from 2 bar to 6 bar (low pressure, LP);
   a converter, operating at the low pressure (LP), operable to be fed with a stream of an ammonia/pressurized air mixture at the low pressure (LP), to oxidize the ammonia and to produce an LP gaseous $NO_x$ gas/steam mixture, comprising water and NO;
   a $NO_x$ gas compressor, operable to elevate the pressure of a gaseous $NO_x$ stream from the low pressure (LP) to a pressure ranging from 9 bar to 16 bar (high pressure, HP), resulting, at its downstream side, in an HP gaseous $NO_x$ stream;
   an absorber unit, operating at the high pressure (HP), operable to react the nitrogen oxides contained in the high pressure (HP) gaseous $NO_x$ stream with water, wherein the absorber unit-provides an output product stream containing nitric acid and dissolved nitrogen oxides, and a tail gas; and
   a bleacher unit, operable to strip dissolved nitrogen oxides away from the output product stream with a stripping medium, providing a stripped nitric acid stream and a $NO_x$-loaded stripping gas;
   wherein
   the bleacher unit operates at the high pressure (HP), which is about equal to the pressure at which the absorber unit is operating;
   the bleacher unit is in fluid communication with a source of high pressure (HP) oxygen-rich gas, for providing the bleacher unit with the high pressure (HP) oxygen-rich gas as a stripping medium;

the plant comprising means for directing the $NO_x$-loaded stripping gas to the downstream side of the $NO_x$ gas compressor;

the plant being characterised in that it further comprises:

a high pressure (HP) water electrolyzer, operating at a gas pressure of at least 9 bar, in fluid communication with the bleacher unit for providing the high pressure (HP) oxygen-rich gas at a pressure ranging from 9 bar to 16 bar to be used as the stripping medium, alone or mixed with pressured air or any other suitable gas, the method comprising steps of:

a) operating the bleacher unit at the high pressure (HP), which is about equal to the pressure at which the absorber unit is operating;

b) providing the bleacher unit with the high pressure (HP) oxygen-rich gas as the stripping medium at the pressure ranging from 9 bar to 16 bar, wherein the high pressure (HP) oxygen-rich gas is provided by the high pressure (HP) water electrolyzer; and c) directing the $NO_x$-loaded stripping gas to downstream of the $NO_x$ gas compressor.

7. The method according to claim 6, wherein the HP oxygen-rich gas comprises more than 21 vol % of oxygen.

8. The method of claim 7, wherein the HP oxygen-rich gas comprises more than 95 vol % of oxygen.

9. The method according to claim 6, wherein the method further comprises, before step b), the step of:

d) pre-heating the HP oxygen-rich gas as a stripping medium to a temperature ranging from ambient temperature to 120° C.

10. The method of claim 9, wherein the temperature of the preheated HP oxygen-rich gas is from 50° C. to 120° C.

11. The method of claim 9, wherein the water electrolyzer operates at a gas pressure of 9 bar to 30 bar.

12. The method according to claim 6, wherein the plant further comprises a flash vessel in fluid communication with the bleacher unit, the bleacher unit further comprising:

an inlet for the stripped nitric acid stream in fluid communication with the bleacher unit;

wherein the stripped nitric acid stream is flashed reduced in pressure from the high pressure (HP) to the low pressure (LP);

a first outlet for gases produced in the flash vessel, in fluid communication with an upstream section of the $NO_x$ gas compressor; and a second outlet for collecting the flashed nitric acid stream from the flash vessel, and the method further comprising the steps of:

e) flashing the stripped nitric acid stream from the high pressure (HP) to the low pressure (LP), and f) directing gases produced in the flash vessel, to an upstream section of the $NO_x$ gas compressor.

13. The method according to claim 6, wherein the method further comprises, in the plant, the steps of:

g) operating a second bleacher unit at the low pressure (LP), which is lower than the pressure at which the bleacher unit is operating;

h) providing the second bleacher unit with a high pressure (HP) oxygen-rich gas as a stripping medium; and i) directing the $NO_x$-loaded stripping gas to upstream of the $NO_x$ gas compressor.

* * * * *